United States Patent
Purdy et al.

(10) Patent No.: US 6,790,686 B1
(45) Date of Patent: Sep. 14, 2004

(54) METHOD AND APPARATUS FOR INTEGRATING DISPATCH AND PROCESS CONTROL ACTIONS

(75) Inventors: Matthew A. Purdy, Austin, TX (US); Cabe W. Nicksic, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 125 days.

(21) Appl. No.: 10/323,562

(22) Filed: Dec. 18, 2002

(51) Int. Cl.⁷ .............................................. H01L 21/66
(52) U.S. Cl. ............................................ 438/14; 438/9
(58) Field of Search ................................ 438/9, 14, 15

(56) References Cited

U.S. PATENT DOCUMENTS

| | | | |
|---|---|---|---|
| 6,238,937 B1 * | 5/2001 | Toprac et al. | 438/9 |
| 6,419,846 B1 * | 7/2002 | Toprac et al. | 216/60 |
| 6,471,833 B2 * | 10/2002 | Kumar et al. | 204/192.37 |
| 6,564,114 B1 * | 5/2003 | Toprac et al. | 700/121 |
| 6,665,623 B1 * | 12/2003 | Pasadyn et al. | 702/84 |
| 6,687,561 B1 * | 2/2004 | Pasadyn et al. | 700/110 |

* cited by examiner

*Primary Examiner*—John F. Niebling
*Assistant Examiner*—Olivia T. Luk
(74) *Attorney, Agent, or Firm*—Williams, Morgan & Amerson

(57) ABSTRACT

A method includes scheduling a plurality of workpieces for processing by a plurality of tools. Each workpiece has an associated priority. The processing in at least one of the tools is controlled in accordance with a process control model. A process control request associated with the controlling of the tool is generated. The priorities of at least a subset of the workpieces are determined based on the process control request. A manufacturing system includes a plurality of tools for processing workpieces, a dispatch unit, and a process control unit. The dispatch unit is configured to schedule a plurality of workpieces for processing by the tools. Each workpiece has an associated priority. The process control unit is configured to control the processing in at least one of the tools in accordance with a process control model and generate a process control request associated with the controlling of the tool. The dispatch unit is further configured to receive the process control request and determine the priorities of at least a subset of the workpieces based on the process control request.

25 Claims, 2 Drawing Sheets

METHOD AND APPARATUS FOR INTEGRATING DISPATCH AND PROCESS CONTROL ACTIONS

BACKGROUND OF THE INVENTION

1. Field of the Invention

This invention relates generally to an industrial process and, more particularly, to a method and apparatus for integrating dispatch and process control actions in a semiconductor fabrication process.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g. transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, rapid thermal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Target values for the various processes performed are generally based on design values for the devices being fabricated. For example, a particular process layer may have a target thickness. Operating recipes for deposition tools and/or polishing tools may be automatically controlled to reduce variation about the target thickness. In another example, the critical dimensions of a transistor gate electrode may have an associated target value. The operating recipes of photolithography tools and/or etch tools may be automatically controlled to achieve the target critical dimensions.

Typically, a control model is used to generate control actions for changing the operating recipe settings for a process tool being controlled based on feedback or feedforward metrology data collected related to the processing by the process tool. To function effectively, a control model must be provided with metrology data in a timely manner and at a quantity sufficient to maintain its ability to predict the future operation of the process tool it controls.

In a fabrication facility, a dispatch system is provided for scheduling wafers through the required process and metrology steps. The dispatch system seeks to optimize tool utilization and provide a smooth flow of product through the fabrication facility. Typically, the dispatch system uses a priority system that gives higher priority lots preferred access to the various tools. Priorities may be determined based on factors such as device type, anticipated performance, business goals, etc.

Activities in a fabrication facility are typically conducted in a non-sequential fashion. For example, lots are typically not measured in the order they are processed. Because the process control and dispatch systems are constructed with different goals in mind, the scheduling performed by the dispatch system may not result in the generation of the data desired for effective operation of the process control system. For example, the process control system may desire a schedule that interrupts the smooth flow of products, while the dispatch system may prioritize lots in such a way reduces the effectiveness of process control.

The present invention is directed to overcoming, or at least reducing the effects of, one or more of the problems set forth above.

SUMMARY OF THE INVENTION

One aspect of the present invention is seen in a method that includes scheduling a plurality of workpieces for processing by a plurality of tools. Each workpiece has an associated priority. The processing in at least one of the tools is controlled in accordance with a process control model. A process control request associated with the controlling of the tool is generated. The priorities of at least a subset of the workpieces are determined based on the process control request.

Another aspect of the present invention is seen in a manufacturing system including a plurality of tools for processing workpieces, a dispatch unit, and a process control unit. The dispatch unit is configured to schedule a plurality of workpieces for processing by the tools. Each workpiece has an associated priority. The process control unit is configured to control the processing in at least one of the tools in accordance with a process control model and generate a process control request associated with the controlling of the tool. The dispatch unit is further configured to receive the process control request and determine the priorities of at least a subset of the workpieces based on the process control request.

BRIEF DESCRIPTION OF THE DRAWINGS

The invention may be understood by reference to the following description taken in conjunction with the accompanying drawings, in which like reference numerals identify like elements, and in which.

Figure 1:
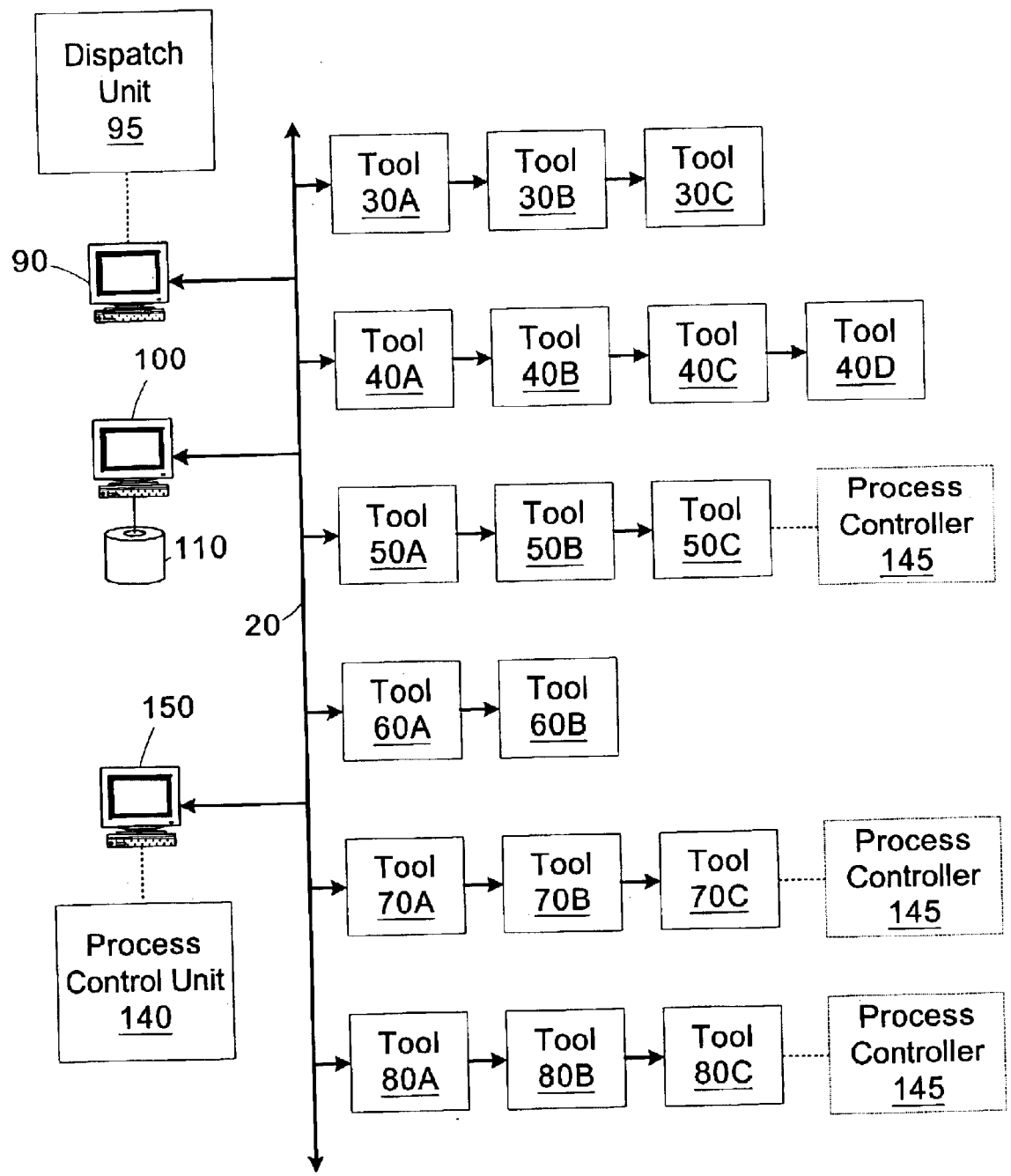
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools 30–80 may be arranged in any physical order or grouping. Additionally, the connections between the tools in a particular grouping are meant to represent connections to the network 20, rather than interconnections between the tools 30–80.

A manufacturing execution system (MES) server 90 directs high level operation of the manufacturing system 10. The MES server 90 hosts a dispatch unit 95 that monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, etc.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes a process control unit 140 executing on a workstation 150. The process control unit 140 determines control actions for controlling selected ones of the tools 30–80 serving as process tools based on metrology data collected during the fabrication of wafers (i.e., by others of the tools 30–80 serving as metrology tools). The process control unit 140 may instantiate one or more process controllers 145 associated with individual tools 30–80 for determining the control actions. An exemplary system capable of generating control actions in this manner is described in U.S. patent application Ser. No. 09/789,871, entitled, "METHOD AND APPARATUS FOR CONTROLLING A TOOL USING A BASELINE CONTROL SCRIPT," subject a common assignee, and incorporated herein by reference in its entirety. The particular control models used by the process control unit 140 to implement the process controllers 145 depend on the type of tool 30–80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

The process control unit 140 interfaces with the dispatch unit 95 to influence how the dispatch unit 95 routes wafers through the process flow of the manufacturing system 10. In general, the process control unit 140 generates a process control request and communicates that request to the dispatch unit 95. The dispatch unit 95 then incorporates the process control request along with its other prioritization rules in determining the relative priorities of lots or wafers processed by the manufacturing system. In this manner the goals of the process control unit 140 can be harmonized with the goals of the dispatch unit 95.

In a general example, if two lots are scheduled for a metrology operation, but have similar priorities, the dispatch unit 95 may otherwise decide arbitrarily which to process first. However, based upon the input from the process control unit 140, the dispatch unit 95 may increase the priority of one of the lots thereby giving it preference. In some cases the priorities of competing lots may not be the same. Accordingly, even if the priority of one of the lots is increased based on the process control request, it may not ultimately be ranked higher than the other lot. The other goals addressed by the dispatch unit may still control. The following specific examples illustrate possible situations where the process control unit 140 may communicate process control requests to the dispatch unit 95. The application of the present invention is not limited to the specific scenarios described.

In a first example, the process control unit 140 communicates the order of the lots/wafers processed through a particular control algorithm (e.g., one of the process controllers 145). In general, the process control system 140 would prefer that the lots be measured using a last-in-first-out order. Thus, the metrology data having the highest relevance to the current state of the process tool 30–80 would be collected first. Using the processing order data provided by the process control unit 140, the dispatch unit 95 can increase the priorities of the later lots relative to that of the earlier lots to accommodate the goal of the process control unit 140.

In a second example, the process control unit 140 may alert the dispatch unit 95 of a potential interruption of the normal production flow. Typically, the APC system tracks the lots processed by a process tool after the latest metrology update, referred to as lots in jeopardy. The process control unit 140 monitors lots in jeopardy to ensure that it receives sufficient metrology information to ensure that the process controller 145 is able to sufficiently predict the state of the tool 30–80 such that it generates valid control actions. If a sufficient number of lots are processed without an intervening metrology update based on a jeopardy threshold, the process control unit 140 will prohibit processing of future lots until a metrology update is received. A jeopardy interruption reduces the efficiency of the manufacturing system 10 due to underutilized tool resources. To avoid jeopardy interruptions, the process control unit 140 monitors jeopardy threads for the process controllers 145. As the size of the jeopardy queue increases, the process control unit 140 sends a process control request to the dispatch unit 95 indicating the lots in jeopardy. For example, the process control unit 140 may send the lots in a particular jeopardy thread to the dispatch unit when the thread exceeds a predetermined size (e.g., a percentage of the jeopardy threshold). Based on the jeopardy information, the dispatch unit 95 increases the priority of the lots in the jeopardy thread to increase the likelihood that a metrology update will be generated prior to the jeopardy threshold being exceeded and the production flow being interrupted.

In a third example, the process control unit 140 communicates a process control request that seeks to increase the priority of a specific type of lot. For example, consider a case where there are two processing steps, A and B, and one metrology step, C. A shift in a characteristic measured by the metrology step C may be observed by the process controller 145, but there is insufficient information to determine whether the source of the shift is from process step A performed by a tool A1 or process step B performed by a tool B1. The process control unit 140 generates a process control request that specifies that lots processed using the tool A1 be given a priority that increases the likelihood that the process step B will be performed by a tool other than B1 (e.g., B2 or B3). In this manner the lot may be assigned one priority considered when scheduling processing in B1, and a different priority for consideration when scheduling for processing in a different tool. In this manner, processing in B1 would not be precluded, but would be less likely as compared to other tools. Processing in B1 might be desirable to avoid a bottleneck on the other tools, contrary to one of the manufacturing flow goals of the dispatch unit 95. It would not be necessary that all lots processed in A1 be processed in tools other than B1, but rather it would be beneficial if one or more of the lots be directed as such. This goal is achieved by using multiple priorities for the different tools 30–80 capable of performing process step B.

After a particular process control goal is achieved, such as the performance of a metrology update for a jeopardy thread, or the identification of a source of variation, the process control unit 140 may send a process control request to the dispatch unit 95 indicating that the factors affecting the relative priorities of the lots may be removed and the priorities redetermined based on current goals of the dispatch unit 95 and the goals communicated by the process control unit 140 in other process control requests.

There are various techniques that the process control unit 140 and dispatch unit may communicate process control requests. These techniques may be direct or indirect. A direct communication technique may involve an exchange of messages via a network connection (TC/IP, HTTP, etc.). An indirect communication technique may involve the process control unit 140 writing the data associated with the process control requests to a specified network location or a shared database. The dispatch unit 95 may then access the shared data to adjust its priorities. The dispatch unit 95 may update its priorities periodically (i.e., at specified time intervals) or transactionally (i.e., when a particular lot requires processing, the dispatch unit 95 can determine if any process control requests impacting the priority of the lot are in effect).

Figure 2:
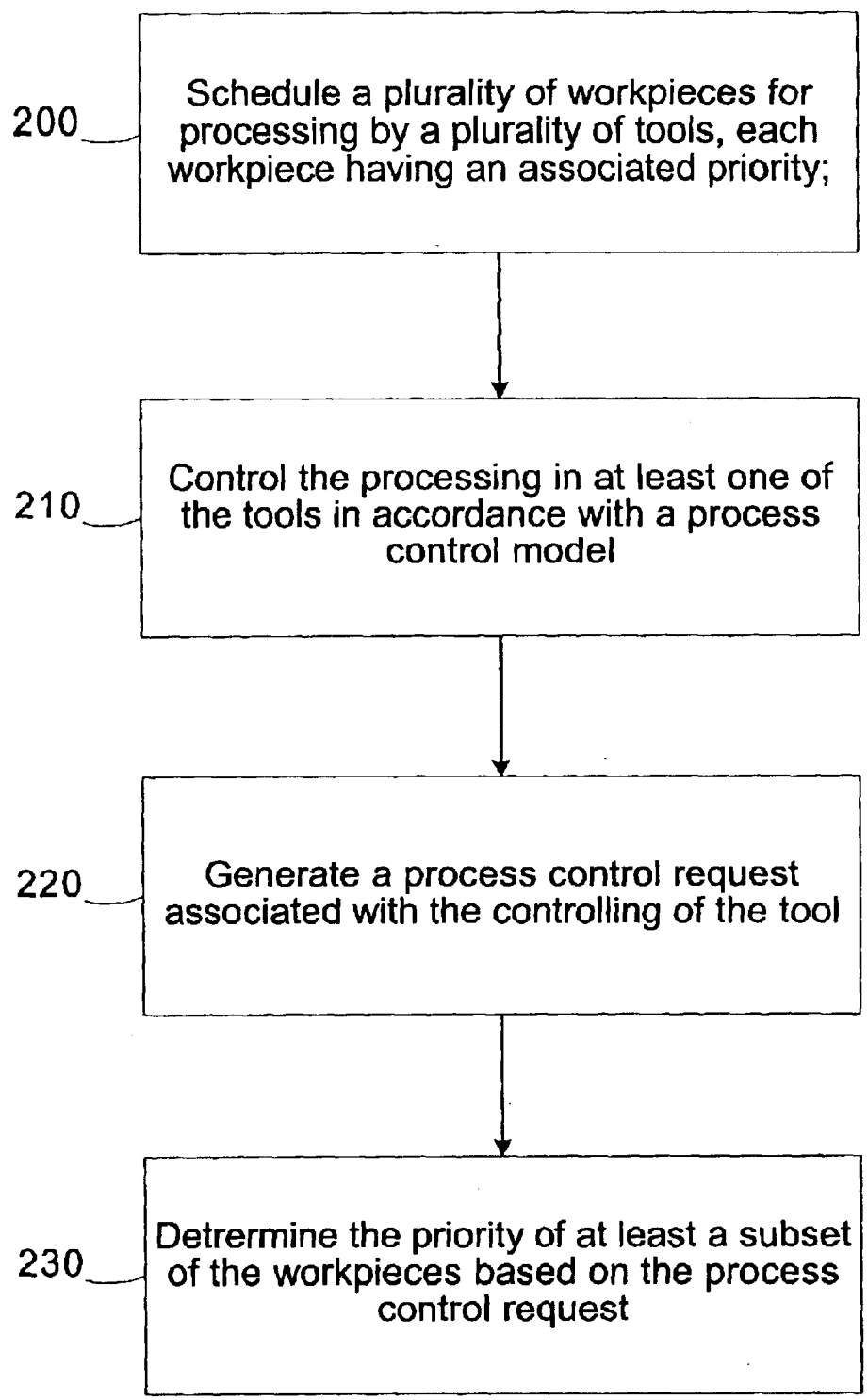
FIG. 2 is a simplified flow diagram of a method for integrating dispatch and process control actions in accordance with another embodiment of the present invention.

Turning now to FIG. 2, a simplified flow diagram of a method for integrating dispatch and process control actions in accordance with another embodiment of the present invention is provided. In block 200, a plurality of workpieces is scheduled for processing by a plurality of tools. Each workpiece has an associated priority. Processing includes the performance of both process steps and metrology steps. In block 210, the processing in at least one of the tools is controlled in accordance with a process control model. In block 220, a process control request associated with the controlling of the tool is generated. In block 230, the priority of at least a subset of the workpieces is determined based on the process control request.

Interfacing the process control unit 140 and dispatch unit 95, as described above, has numerous advantages. The different goals of the process control and dispatch systems can be considered when scheduling the wafers for processing. This harmonization of goals tends to increase the efficiency of the manufacturing system 10 by avoiding interruptions and to increase the effectiveness of the process control activities, thus increasing the performance of the manufactured devices. Both of these enhancements generally result in an increase in the profitability of the manufacturing system 10.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
scheduling a plurality of workpieces for processing by a plurality of tools, each workpiece having an associated priority;
controlling the processing in at least one of the tools in accordance with a process control model;
generating a process control request associated with the controlling of the tool; and
determining the priorities of at least a subset of the workpieces based on the process control request.

2. The method of claim 1, wherein generating the process control request comprises generating a list of workpieces in jeopardy that have been processed subsequent to a first metrology update.

3. The method of claim 2, wherein determining the priorities further comprises increasing the priority of at least a first subset of the workpieces in the list relative to other workpieces not in the list.

4. The method of claim 3, further comprising:
measuring a characteristic of at least one of the workpieces in the list to generate a second metrology update; and
redetermining the priorities of at least a second subset of the workpieces in the list responsive to generating the second metrology update.

5. The method of claim 1, wherein generating the process control request comprises generating a processing history for the workpieces indicating a time a particular processing event has occurred.

6. The method of claim 5, wherein determining the priority further comprises increasing the priority of a first workpiece having a later processing event time relative to a second workpiece having an earlier processing event time.

7. The method of claim 5, wherein determining the priority further comprises determining the priorities to implement a last-in-first-out prioritization based on the processing history of the workpieces.

8. The method of claim 1, further comprising identifying a deviation in the processing of the workpieces associated with at least a first tool that performed a first process event and a second tool that performed a second process event, wherein generating the process control request comprises generating a request identifying the first and second process events and the first and second tools.

9. The method of claim 8, further comprising identifying a subset of the workpieces having the first process event performed by the first tool and awaiting the performance of the second process event, wherein determining the priorities further comprises increasing the priority of at least one workpiece in the subset to encourage performance of the second process event in one of the tools other than the second tool.

10. The method of claim 1, wherein generating the process control request further comprises storing the process control request in a predetermined location on a computer network.

11. The method of claim 1, wherein generating the process control request further comprises storing the process control request in a shared database on a computer network.

12. The method of claim 1, wherein generating the process control request further comprises sending the process control request from a process control unit to a dispatch unit in a manufacturing system.

13. A manufacturing system, comprising:

a plurality of tools for processing workpieces;

a dispatch unit configured to schedule a plurality of workpieces for processing by the tools, each workpiece having an associated priority; and a process control unit configured to control the processing in at least one of the tools in accordance with a process control model and generate a process control request associated with the controlling of the tool, wherein the dispatch unit is further configured to receive the process control request and determine the priorities of at least a subset of the workpieces based on the process control request.

14. The system of claim 13, wherein the process control request comprises a list of workpieces in jeopardy that have been processed subsequent to a first metrology update.

15. The system of claim 14, wherein the dispatch unit is configured to increase the priority of at least a first subset of the workpieces in the list relative to other workpieces not in the list.

16. The system of claim 15, wherein the plurality of tools includes a metrology tool configured to measure a characteristic of at least one of the workpieces in the list to generate a second metrology update, and the dispatch unit is further configured to redetermine the priorities of at least a second subset of the workpieces in the list responsive to the second metrology update.

17. The system of claim 13, wherein the process control request includes a processing history for the workpieces indicating a time a particular processing event has occurred.

18. The system of claim 17, wherein the dispatch unit is configured to increase the priority of a first workpiece having a later processing event time relative to a second workpiece having an earlier processing event time.

19. The system of claim 17, wherein the dispatch unit is configured to determine the priorities to implement a last-in-first-out prioritization based on the processing history of the workpieces.

20. The system of claim 13, wherein the process control unit is configured to identify a deviation in the processing of the workpieces associated with at least a first tool that performed a first process event and a second tool that performed a second process event, and the process control request includes information identifying the first and second process events and the first and second tools.

21. The system of claim 20, wherein the dispatch unit is configured to identify a subset of the workpieces having the first process event performed by the first tool and awaiting the performance of the second process event, and increase the priority of at least one workpiece in the subset to encourage performance of the second process event in one of the tools other than the second tool.

22. The system of claim 13, wherein the process control unit is configured to store the process control request in a predetermined location on a computer network, and the dispatch unit is configured to retrieve the process control request from the predetermined location.

23. The system of claim 13, wherein the process control unit is configured to store the process control request in a database shared with the dispatch unit.

24. The system of claim 13, further comprising a computer network connecting the process control unit and the dispatch unit, wherein the process control unit is configured to send the process control request to the dispatch unit over the computer network.

25. A system, comprising:

a plurality of tools for processing workpieces;

means for scheduling a plurality of workpieces for processing by the plurality of tools, each workpiece having an associated priority;

means for controlling the processing in at least one of the tools in accordance with a process control model;

means for generating a process control request associated with the controlling of the tool; and means for determining the priorities of at least a subset of the workpieces based on the process control request.

* * * * *